3,138,231
HOIST EMPLOYING CLUTCH-BRAKE
Frank J. Lock, Philadelphia, Pa., assignor, by mesne assignments, to Yale and Towne Inc., New York, N.Y., a company of Ohio
Filed Feb. 23, 1961, Ser. No. 91,241
4 Claims. (Cl. 192—16)

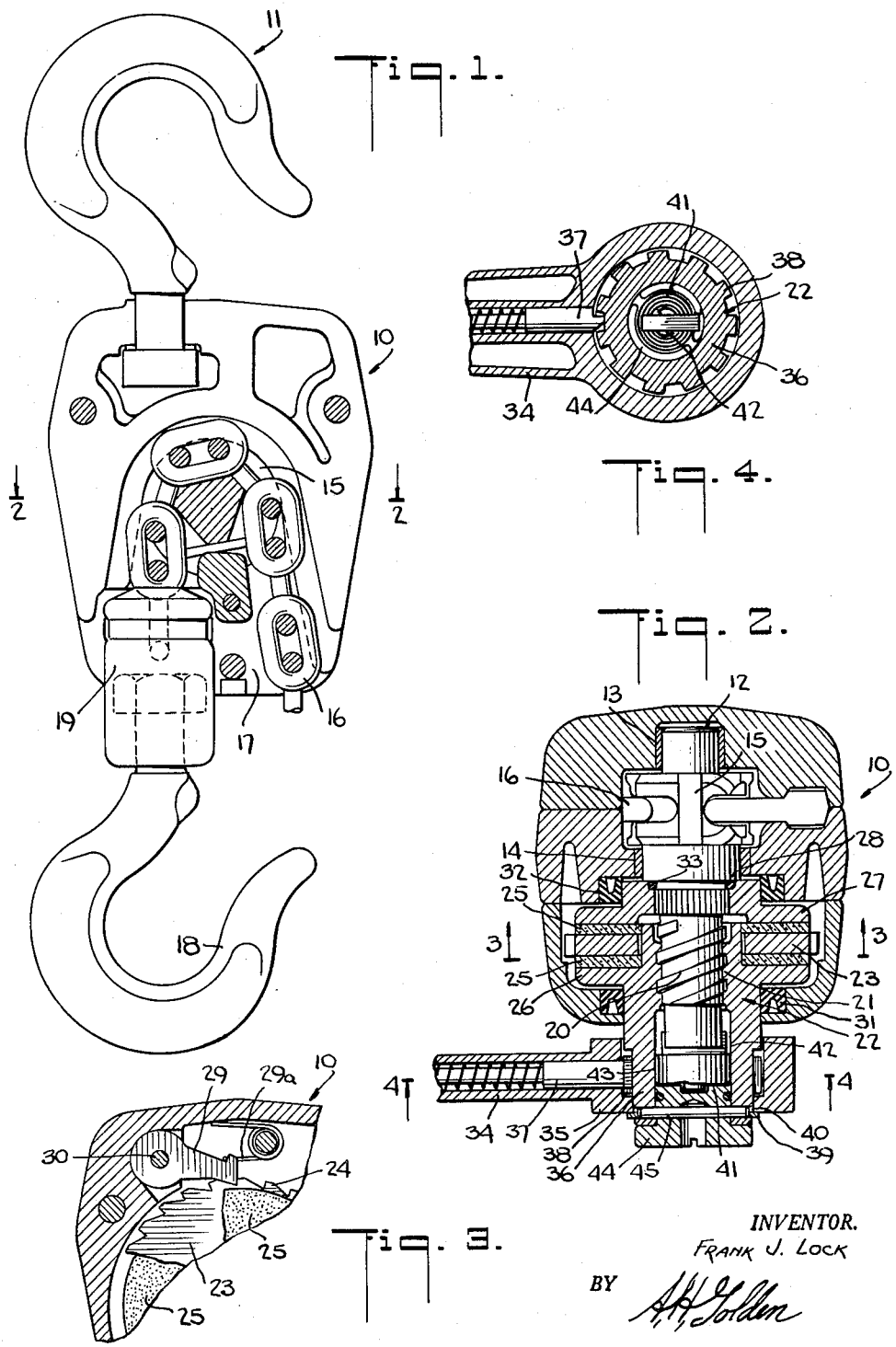

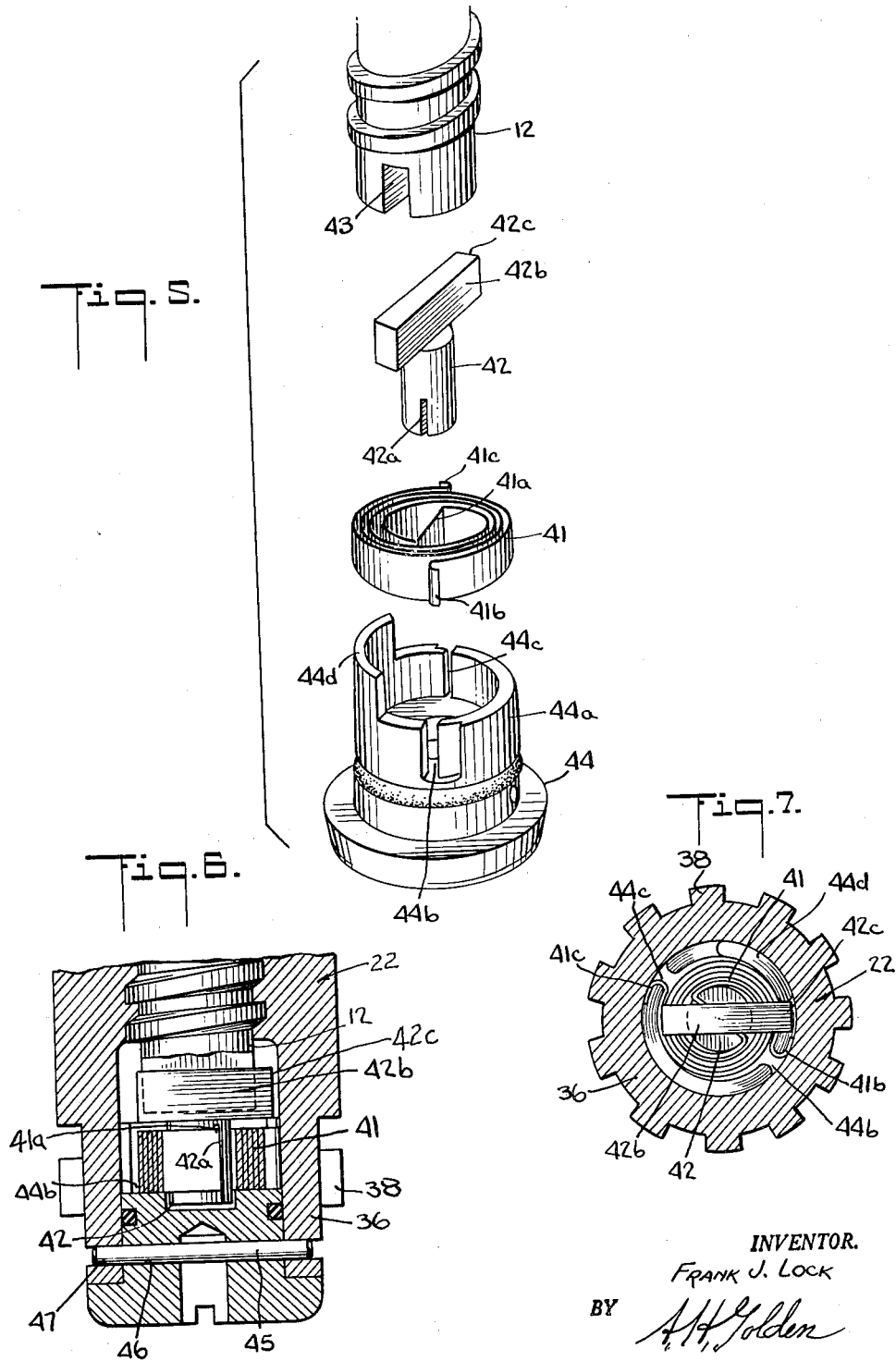

This invention relates to a so-called Weston type hoist or pulling device.

In a hoist of this type the load is lifted through a brake hub that is threaded on the load shaft and moves endwise relative to the load shaft when rotated by means of a lever or chain wheel. While this endwise movement of the brake hub is slight, it is effective to bind a one-way ratchet to the load shaft through the intermediary of friction discs. Continued rotation of the brake hub after binding rotates the load shaft and the one-way ratchet as a unit to lift the load. Reverse rotation of the load shaft by the load in a lowering direction is prevented by a pawl in engagement with the one-way ratchet.

When it is desired to lower the load, the brake hub is rotated in the opposite direction relative to the load shaft. This effects endwise movement of the brake hub in a direction to relieve the braking action of the friction discs on the one-way ratchet. Therefore, the load shaft slips relatively to the one-way ratchet, the ratchet being held against rotation in a lowering direction by its pawl. Such slippage, and, therefore, lowering of the load, continues so long as the brake hub is rotated in a lowering direction at a greater speed than that at which the load shaft is rotated by the load.

If rotation of the brake hub in the lowering direction is stopped, continued rotation of the load shaft by the load relatively to the brake hub again binds the one-way ratchet to the load shaft because of the threaded relation between the brake hub and the load shaft, so that rotation of the load shaft in the lowering direction is stopped by the pawl of the one-way ratchet and the load is safely held against dropping. This, of course, occurs only if the brake hub is held from rotating with the load shaft. If the brake hub rotates with the load shaft, it does not move endwise relatively to the load shaft to bind the load shaft to the one-way ratchet.

In present hoist constructions of this type, the force resisting rotation of the brake hub to prevent its rotation with the load shaft is provided either by the frictional force of the pawl of the operating lever acting on the brake hub in a lever type hoist, or the inertia and weight of the chain and wheel in a chain wheel type hoist. This force exerted by the pawl or chain wheel is quite slight but is adequate to insure binding of the load shaft to the one-way ratchet because of the low helix angle of the threads between the brake hub and the load shaft. I have found, however, that when a heavy load is lifted or lowered with a hoist of this type, the threads of low helix angle are so efficient that the brake hub binds tightly against the ratchet, particularly when the load is lowered at a relatively fast speed and is brought to a sudden stop. It then becomes almost physically impossible to release the load shaft from the one-way ratchet to lower the load.

The purpose of my invention is to provide an improved construction for a hoist of the Weston type, which will permit the use of threads of a relatively high helix angle to prevent the undesirable binding action caused by threads of low helix angle when a heavy load is lowered rapidly and brought to a sudden stop, and which at the same time will provide for effective braking control of a load. To this end, the hoist of the invention includes means for ensuring relative rotation between the brake hub and the load shaft in a direction to bind the load shaft to the one-way ratchet whenever the brake hub is not positively rotated manually or by power means in a load lowering direction. By providing such means, I make certain that the increased tendency of the brake hub and load shaft to rotate together, because of the use of threads of higher helix angle, is effectively offset.

In a preferred form of the invention, as will be described hereafter, these means are in the form of a simple spring interconnecting the brake hub and load shaft and continuously urging relative rotation thereof in a direction to bind the load shaft to the one-way ratchet.

My invention and the advantages thereof having been broadly described, a more detailed description of one form of the invention is described hereafter in conjunction with the accompanying drawings, wherein:

FIG. 1 is a sectional elevational view of a hoist constructed in accordance with the present invention, FIG. 2 is a sectional view taken on the line 2—2 of FIG. 1, FIG. 3 is a partial sectional view taken on the line 3—3 of FIG. 2 to show the pawl of the one-way ratchet, FIG. 4 is a sectional view taken on the line 4—4 of FIG. 2 showing the engagement of the pawl of the operating lever with the brake hub, and showing the spring interconnecting the brake hub and the load shaft, FIG. 5 is an exploded view of a portion of the hoist showing how the spring is assembled to interconnect the brake hub and the load shaft, FIG. 6 is an enlarged sectional view of the part of the hoist incorporating the spring, showing the spring assembled, and FIG. 7 is an enlarged sectional view similar to that shown in FIG. 4 but showing the operating lever removed.

Referring to the drawings, the invention is shown incorporated in a simple lever type hoist or puller having a casing 10 which is adapted to be supported by means of a hook 11 which is secured to the top of casing 10 for swivel movement relatively to the casing.

The load shaft of the hoist, generally designated by the numeral 12, is supported for rotation within the casing 10 by means of spaced bearings 13 and 14, and includes an integral sprocket portion 15 over which a hoist chain 16 is trained so that the hoist chain may be raised and lowered by rotation of the load shaft 12. The ends of the hoist chain 16 extend through an opening 17 provided through the lower side of the casing 10, and a lift hook 18 is attached to one end of the hoist chain 16 by a suitable swivel coupling 19.

One end of the load shaft 12 is provided with threads 20 which engage internal threads 21 of a brake hub 22 mounted thereon, so that rotation of the brake hub 22 relatively to the load shaft 12 results in axial, endwise movement of the brake hub 22 relatively to the load shaft 12.

A loosely mounted one-way ratchet 23, having teeth 24 on the outer periphery thereof and a friction disc 25 disposed on each side thereof, is interposed between a flange 26 of the brake hub 22 and a flange member 27 carried by the load shaft 12. The flange member 27 bears against a shoulder 28 on the load shaft 12 so that when brake hub 22 is turned relatively to the load shaft 12 in a clockwise direction as viewed in FIG. 4, the resulting endwise movement of the brake hub 22 toward the flange member 27, due to the engagement of threads 20 and 21, binds the load shaft 12 to the ratchet wheel 23 through the intermediary of the friction discs 25. Continued rotation of the brake hub 22 in the same direction results in rotation of the load shaft 12 and ratchet wheel 23 as a unit to raise the end of the hoist chain 16 which carries the load hook 18. Thus, raising of a load is effected by rotating the brake hub 22 in a clockwise direction.

Reverse rotation of the load shaft 12 by the weight of a load carried by the hook 18 is prevented by a pawl 29 which engages the teeth 24 of the ratchet 23, as shown in FIG. 3. The pawl 29 is pivotally mounted on a pin 30 secured to the casing 10 and is urged toward the ratchet 23 by a spring 29a. The braking surfaces of the ratchet 23, flange 26, flange member 27 and friction discs 25 are conveniently sealed against dust, oil, grease or other foreign material by suitable seals 31, 32 and 33. Seal 31 surrounds the brake hub 22 and prevents the passage of dust, oil, grease or other foreign material between the brake hub and the casing 10, while the seal 32 surrounds a hub portion of the flange member 27 and prevents the passage of dust, oil, grease or other foreign material between the flange member 27 and the casing 10. Seal 33 surrounds the load shaft 12 adjacent the shoulder 28 and prevents the passage of dust, oil, grease or other foreign material between the flange member 27 and the load shaft 12.

In the hoist illustrated, the brake hub 22 is conveniently rotated by means of a lever 34, which is partially shown in FIGS. 2 and 4. The lever 34 has a hub portion 35 which surrounds a hollow extension 36 of the brake hub 22, and has a reversible pawl 37 which engages ratchet teeth 38 provided on the exterior surface of the extension 36 of the brake hub 22. The lever 34 is held on the extension 36 by a split retaining ring 39 which seats in a groove 40 provided in the surface of the extension 36.

When it is desired to lower a load carried by the load hook 18, the pawl 37 is reversed from the position shown in FIG. 4, and the brake hub 22 rotated by the lever 34 in a counterclockwise direction, as viewed in FIG. 4. This effects endwise movement of the brake hub 22 in a direction to relieve the braking action of the friction discs 25 so that the load shaft 12 slips relatively to the one-way ratchet 23, with the one-way ratchet being held against rotation in a lowering direction by its pawl 29. Such slippage, and, therefore, lowering of the load continues so long as the brake hub 22 is rotated in a lowering direction at a greater speed than that at which the load shaft 12 is rotated by the load.

If rotation of the brake hub 22 in the lowering direction is stopped, slight continued rotation of the load shaft 12 relatively to the brake hub 22 by the weight of a load supported on the load hook 18 again binds the one-way ratchet 23 to the load shaft 12 because of the engagement between the threads 20 and 21. Rotation of the load shaft 12 in the lowering direction is then prevented by engagement of the pawl 29 with the ratchet 23, and the load is safely held against dropping. This, of course, occurs only if the brake hub 22 is held from rotating with the load shaft 12. If the brake hub 22 rotates with the load shaft 12, it cannot move endwise relatively to the load shaft 12 to bind the load shaft 12 to the one-way ratchet 23.

In accordance with the present invention, such rotation of the brake hub 22 with the load shaft 12 is prevented by the provision of means for ensuring relative rotation between the brake hub 22 and the load shaft 12 in a direction to bind the load shaft 12 to the one-way ratchet 23 whenever the brake hub 22 is not positively rotated by the lever 34, or some other means.

As best shown in FIGS. 5, 6 and 7, the means for ensuring such relative rotation between the brake hub 22 and the load shaft 12 may conveniently take the form of a coil spring 41 which is disposed within the hollow extension 36 of the brake hub 22. Preferably, the spring 41 is a double spring having a center portion 41a from which two separate sets of convolutions extend, with one set terminating in an outer hooked end 41b, and the other set terminating in an outer hooked end 41c.

The center portion 41a of the spring 41 is received in a slot 42a of an arbor member 42, and arbor member 42 in turn is provided with a cross head 42b which is received in a slot 43 provided in the end of the load shaft 12 so that the arbor member 42 is keyed to the load shaft 12. Thus, the inner end 41a of the spring 41 is connected to the load shaft 12 by means of the arbor member 42.

The outer end of the hollow extension 36 of the brake hub 22 is provided with a cap 44 which is secured to the extension 36 by a removable pin 45. The cap 44 has an annular flange 44a into which the spring 41 extends with the hooked ends 41b and 41c extending through and engaging the edges of diametrically opposed slots 44b and 44c formed in the flange 44a. The outer hooked ends 41b and 41c of the spring 41 are thus effectively connected to the brake hub 22 by the cap 44 and pin 45, while the inner end 41a of spring 41 is connected to the load shaft 12 by means of the arbor member 42.

The spring 41 is pre-stressed so that it always rotates brake hub 22 relatively to the load shaft 12 in a direction to bind the load shaft 12 to the one-way ratchet 23, whenever the brake hub 22 is not positively rotated in the opposite direction by the lever 34 to release the braking action. Thus, the threads 20 and 21 between the shaft 12 and brake hub 22 may be of relatively high helix angle because the increased tendency of the brake hub 22 and load shaft 12 to rotate together by reason of the use of such threads is effectively offset by the force of the spring 41. The spring 41 may be readily pre-stressed by turning the cap 44 relatively to the load shaft 12 to wind the spring 41, and then inserting the pin 45 to lock the cap 44 to the brake hub 22.

As best shown in FIG. 7, one end 42c of the cross head 42b of the arbor member 42 extends further from the axis of the arbor member than the other end, and the end 42c acts as a stop against which an extension 44d of the flange 44a of the cap 44 moves to limit the degree of pre-stressing of the spring 41 by rotation of the cap 44. Cap 44 is provided with a plurality of circumferentially spaced diametrically extending holes 46 for receiving the pin 45, and in prestressing the spring 41, the cap is turned until the flange extension 44d engages the end 42c of the arbor member 42. The cap 44 is then backed off sufficiently to align one of the holes 46 with a hole 47 in the brake hub 22 to allow insertion of pin 45. It will be noted that by the use of a double spring 41 of the type shown, a pair of equal parallel forces acting in opposed directions and forming a couple is exerted by the spring 41 on the brake hub 22, and substantially no lateral force is exerted on the brake hub by the spring 41 which would create additional frictional force between the threads 20 and 21.

From the preceding description it can be seen that there is provided a novel hoist construction in which means are provided for ensuring that the brake hub is rotated relatively to the load shaft to bind the load shaft to the one-way ratchet whenever the brake hub is not positively rotated. In this manner, effective braking control of a load is always obtained even when threads of relatively high helix angle are used between the brake hub and the load shaft. While the invention has been described in conjunction with a hoist in which the sprocket for the hoist chain is carried on the load shaft, it will be appreciated that the invention is equally applicable to hoists in which the sprocket is carried by a separate shaft and is geared to the load shaft to provide additional mechanical advantage.

It will also be appreciated that while a specific form of the invention has been shown and described, changes and modifications can be made therein without departing from the spirit and scope of the invention.

I now claim:

1. In a hoist of the type having a load shaft, a one-way ratchet, a brake hub, friction means and cooperating means on said brake hub and load shaft whereby relative rotation between said brake hub and load shaft in one direction causes endwise movement of said brake hub relative to said load shaft to bind said one-way ratchet to said load shaft through said friction means so that said load shaft is prevented from rotating in one direction by said one-way ratchet, the improvement comprising a resilient spring interconnecting said brake hub and said load shaft and causing rotation of said brake hub relatively to said load shaft in a direction to bind said ratchet to said load shaft whenever said brake hub is not positively rotated in the opposite direction, said spring being a double spring providing a force couple for causing said rotation of said brake hub whereby substantially no lateral force is applied to said brake hub by said spring.

2. A hoist having a housing, a load shaft mounted for rotation in said housing, load engaging means positively connected to said load shaft and movable by rotation of said load shaft to lift and lower a load, a ratchet surrounding said load shaft, a pawl carried by said housing and engaging said ratchet to prevent rotation of said ratchet in one direction, a brake hub surrounding one end of said load shaft, friction means, interengaging threads on said brake hub and load shaft whereby relative rotation between said brake hub and load shaft in one direction causes endwise movement of said brake hub relatively to said load shaft to bind said ratchet to said load shaft through said friction means so that said load shaft is prevented from rotating in said one direction by said ratchet and pawl, a second ratchet on said brake hub, an elongated handle, reversible pawl means on said handle for connecting said handle to said brake hub whereby said brake hub may be rotated in either direction by said handle, and spring means interconnecting said brake hub and said load shaft and causing rotation of said brake hub relatively to said load shaft in a direction to bind said ratchet to said load shaft whenever said brake hub is not positively rotated in the opposite direction by said handle.

3. A hoist having a housing, a load shaft mounted for rotation in said housing, load engaging means positively connected to said load shaft and movable by rotation of said load shaft to lift and lower a load, a ratchet surrounding said load shaft, a pawl carried by said housing and engaging said ratchet to prevent rotation of said ratchet in one direction, a brake hub surrounding one end of said load shaft, friction means, interengaging threads on said brake hub and load shaft whereby relative rotation between said brake hub and load shaft in one direction causes endwise movement of said brake hub relatively to said load shaft to bind said ratchet to said load shaft through said friction means so that said load shaft is prevented from rotating in said one direction by said ratchet and pawl, a second ratchet on said brake hub, an elongated handle, reversible pawl means on said handle for connecting said handle to said brake hub whereby said brake hub may be rotated in either direction by said handle, spring means interconnecting said brake hub and said load shaft and causing rotation of said brake hub relatively to said load shaft in a direction to bind said ratchet surrounding said load shaft to said load shaft whenever said brake hub is not positively rotated in the opposite direction by said handle, means for prestressing said spring means, and means for holding said spring in a stressed condition.

4. In a hoist having a housing, a load shaft mounted for rotation in said housing, load engaging means positively connected to said shaft and movable by rotation of said shaft to lift and lower a load, a one-way ratchet mounted on said shaft for free rotation relatively thereto, friction means, a brake hub screw threaded on said shaft and rotatable relatively to said shaft on said threads whereby rotation of said brake hub relatively to said load shaft effects endwise movement of said brake hub relatively to said load shaft, means for rotating said brake hub in each direction whereby rotation of said brake hub in one direction effects endwise movement of said brake hub in a direction to bind said one-way ratchet and brake hub to said load shaft through said friction means whereby said load shaft may be rotated in said one direction by rotation of said brake hub to lift a load while being prevented from rotating in the opposite direction by said one-way ratchet, and a spring interconnecting said brake hub and said load shaft and yieldingly rotating said brake hub relatively to said load shaft in said one direction to bind said ratchet to said load shaft whenever said brake hub is not positively rotated in said opposite direction.

References Cited in the file of this patent

UNITED STATES PATENTS

| | | |
|---|---|---|
| 774,850 | Mayer | Nov. 15, 1904 |
| 2,254,989 | Benson | Sept. 2, 1941 |
| 2,343,884 | Coffing | Mar. 14, 1944 |
| 2,417,492 | Hinchcliffe | Mar. 18, 1947 |
| 3,056,480 | Carroll | Oct. 2, 1962 |

FOREIGN PATENTS

| | | |
|---|---|---|
| 345,056 | France | Sept. 29, 1904 |
| 224,274 | Britain | Nov. 3, 1924 |